United States Patent
Rencher et al.

(10) Patent No.: US 10,902,387 B2
(45) Date of Patent: Jan. 26, 2021

(54) AIRCRAFT DIGITAL EVENT LEDGER

(71) Applicant: THE BOEING COMPANY, Chicago, IL (US)

(72) Inventors: Robert John Rencher, Normandy Park, WA (US); Roland Nelson Freeman, Goose Creek, SC (US); Alimuddin Mohammad, Sammamish, WA (US); Guijun Wang, Issaquah, WA (US); Marco R. Calderon, Lewisville, TX (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 15/687,018

(22) Filed: Aug. 25, 2017

(65) Prior Publication Data

US 2019/0066061 A1 Feb. 28, 2019

(51) Int. Cl.
*G06Q 10/00* (2012.01)
*G06Q 10/06* (2012.01)
*G01D 9/00* (2006.01)

(52) U.S. Cl.
CPC ............. *G06Q 10/20* (2013.01); *G01D 9/005* (2013.01); *G06Q 10/06315* (2013.01)

(58) Field of Classification Search
CPC ............. G06Q 10/20; G06Q 10/06315; G06Q 10/0639; G06Q 10/06393; G06Q 10/043; G01D 9/005; G09B 19/165; G05D 1/0083; G01S 1/18; G01S 1/16; G64D 2045/0085; B01J 19/0033; G05B 13/00
See application file for complete search history.

(56) References Cited

U.S. PATENT DOCUMENTS

| | | | | |
|---|---|---|---|---|
| 5,908,176 A | * | 6/1999 | Gilyard | G05D 1/0005 244/203 |
| 7,581,434 B1 | * | 9/2009 | Discenzo | G01N 33/2888 73/53.01 |
| 8,787,246 B2 | * | 7/2014 | Brownrigg | H04W 40/22 370/316 |
| 8,982,856 B2 | * | 3/2015 | Brownrigg | H04B 7/18584 370/338 |
| 9,971,352 B1 | * | 5/2018 | Mudalige | B60W 30/00 |

(Continued)

*Primary Examiner* — Tyler W Knox
(74) *Attorney, Agent, or Firm* — Yee & Associates, P.C.

(57) ABSTRACT

A method of operating an aircraft. The method includes sensing, using a trusted sensor, a trusted parameter of the aircraft during operation of the aircraft; receiving, at a processor, the trusted parameter; entering, by the processor, the trusted parameter as a first immutable entry into a ledger stored on an immutable non-transitory computer-recordable storage medium, wherein immutable is defined as unchangeability of data stored on the non-transitory computer-recordable storage medium, and wherein the ledger also contains additional immutable entries regarding operations of the aircraft and an aircraft environment; executing, by the processor, a recursive analysis algorithm on the first immutable entry together with the additional immutable entries to produce analyzed data; and using, by the processor, the analyzed data to improve future operational performance of the aircraft by ordering changes in how a component of the aircraft performs during operation of the aircraft based on the analyzed data.

20 Claims, 9 Drawing Sheets

(56) References Cited

U.S. PATENT DOCUMENTS

| | | | |
|---|---|---|---|
| 10,073,456 B2* | 9/2018 | Mudalige | G05D 1/0214 |
| 10,109,198 B2* | 10/2018 | Qiu | G08G 1/166 |
| 10,409,279 B2* | 9/2019 | Kwon | G06N 7/005 |
| 2002/0099479 A1* | 7/2002 | Chatrenet | G05D 1/0077 |
| | | | 701/15 |
| 2004/0193386 A1* | 9/2004 | Flynn | G01G 19/07 |
| | | | 702/173 |
| 2010/0324758 A1* | 12/2010 | Piasecki | B64C 27/26 |
| | | | 701/3 |
| 2011/0180656 A1* | 7/2011 | Shue | G05B 19/0428 |
| | | | 244/17.13 |
| 2011/0264307 A1* | 10/2011 | Guyette | B64D 1/16 |
| | | | 701/3 |
| 2011/0298658 A1* | 12/2011 | Riley | G01S 19/39 |
| | | | 342/357.26 |
| 2012/0179326 A1* | 7/2012 | Ghelam | G06F 11/3013 |
| | | | 701/31.9 |
| 2013/0030612 A1* | 1/2013 | Constans | G05D 1/0005 |
| | | | 701/14 |
| 2013/0080043 A1* | 3/2013 | Ballin | G08G 5/0078 |
| | | | 701/120 |
| 2013/0289804 A1* | 10/2013 | Covington | G01C 23/00 |
| | | | 701/14 |
| 2013/0327014 A1* | 12/2013 | Moulebhar | F02K 3/065 |
| | | | 60/226.2 |
| 2014/0018980 A1* | 1/2014 | Bollapragada | G08G 5/0021 |
| | | | 701/10 |
| 2014/0252158 A1* | 9/2014 | Schaeffer | B64C 27/57 |
| | | | 244/17.13 |
| 2015/0083850 A1* | 3/2015 | Moser | B64C 13/0425 |
| | | | 244/99.2 |
| 2017/0036773 A1* | 2/2017 | Jones | B64D 27/16 |
| 2017/0166328 A1* | 6/2017 | Ethington | G06Q 10/06311 |
| 2017/0255966 A1* | 9/2017 | Khoury | H04L 67/20 |
| 2018/0011180 A1* | 1/2018 | Warnick | G01S 13/06 |

* cited by examiner

AIRCRAFT DIGITAL EVENT LEDGER

BACKGROUND INFORMATION

1. Field

The present disclosure relates to the design, manufacturing, operation and maintenance of an aircraft using a digital ledger of aircraft events that is kept in association with the design, manufacturing, delivery, operation, maintenance, regulatory compliance and ownership transfer of the aircraft.

2. Background

Within the aviation industry there is a plethora of disparate information systems that manage disparate aircraft event activity data relative to the manufacturing and operation of the aircraft. Thus, a manufacturer, owner or operator of an aircraft has little ability to access, correlate, and/or analyze this data to determine whether maintenance is required, or whether it is advisable to change operational parameters of an aircraft in flight.

Today, this information is often managed in a paper form and boxed for storage retention. Even if data is computerized, the data is stored in disparate systems that do not and/or cannot communicate with each other. Either approach has challenges with respect to the uncertainty of information, the poor timeliness of data, and the limited ability to verify the accuracy of data.

SUMMARY

The illustrative embodiments provide for a method of operating an aircraft. The method includes operating the aircraft. The method also includes sensing, using a trusted sensor, a trusted parameter of the aircraft during operation of the aircraft. The method also includes receiving, at a processor, the trusted parameter. The method also includes entering, by the processor, the trusted parameter as a first immutable entry into a ledger stored on an immutable non-transitory computer-recordable storage medium. Immutable is defined as unchangeability of data stored on the non-transitory computer-recordable storage medium. The ledger also contains additional immutable entries regarding operations of the aircraft and an aircraft environment. The method also includes executing, by the processor, a recursive analysis algorithm on the first immutable entry together with the additional immutable entries to produce analyzed data. The method also includes using, by the processor, the analyzed data to improve future operational performance of the aircraft by ordering changes in how a component of the aircraft performs during operation of the aircraft based on the analyzed data.

The illustrative embodiments also provide for another method of operating an aircraft. The method includes operating the aircraft. The method also includes sensing, using a trusted sensor, a trusted event related to the aircraft during operation of the aircraft. The method also includes receiving, at a processor, the trusted event, wherein the trusted event is defined as data received from a sensor that is predetermined to be trustworthy. The method also includes entering, by the processor, the trusted event as a first immutable entry into a ledger stored on an immutable non-transitory computer-recordable storage medium. Immutable is defined as unchangeability of data stored on the non-transitory computer-recordable storage medium. The ledger also contains additional immutable entries regarding operations of the aircraft. The method also includes executing, by the processor, a recursive analysis algorithm on the first immutable entry together with the additional immutable entries to produce analyzed data. The method also includes using, by the processor, the analyzed data to determine an estimated cause for the trusted event.

The illustrative embodiments also provide for an aircraft including a fuselage and an onboard computer programmed with program code for performing the above-described methods. The illustrative embodiments also provide for a non-transitory computer-recordable storage medium storing program code, which when executed by an onboard computer of an aircraft, performs the above-described methods.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
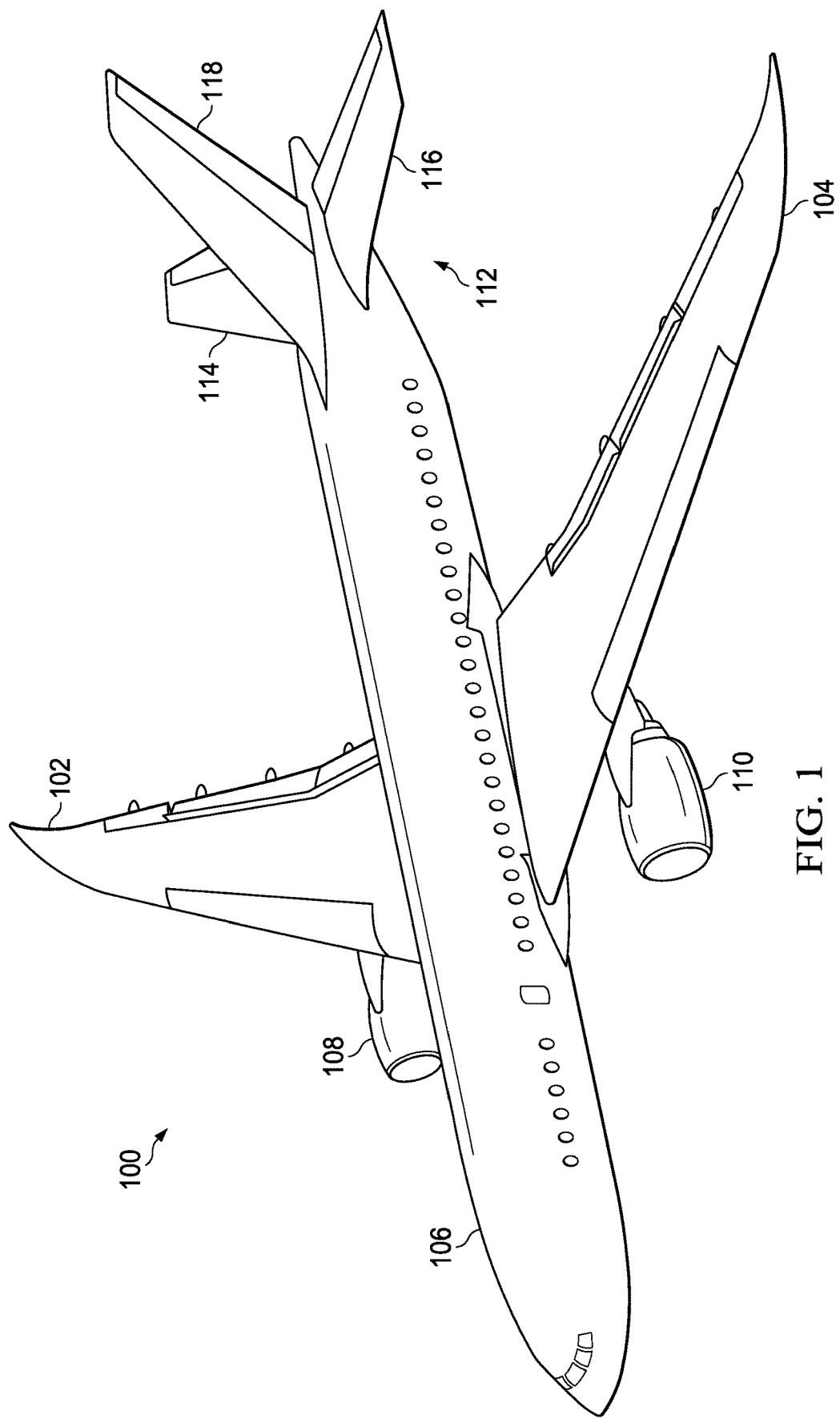
FIG. 1 is an illustration of an aircraft, in accordance with an illustrative embodiment.

The illustrative embodiments recognize and take into account that within the aviation industry there is a plethora of information systems that manage disparate aircraft event activity data relative to the design, manufacturing, and operation of the aircraft. The use of disparate databases means that the event activity owner has limited ability to access, correlate and or analyze this data to determine 1) that a planned event has occurred and the state of the completed event, 2) that an unplanned event has occurred requiring remedial attention, and 3) corollary contributions to determine when an event is expected to occur, the causality of the event and appropriate actions to address the unplanned event.

In addition, the illustrative embodiments recognize and take into account that there are additional challenges that regularly prevent airlines and suppliers from coordinating and optimizing or enhancing inventory. As a result, several inefficiencies occur. For example, extra costs are incurred in the parts stock that is held by airlines to compensate for an unknown event.

However, the illustrative embodiments allow for enhancements of part stock inventory with increased data availability, increased data accuracy, and improved predictive analytics using the aircraft digital event ledger described herein. Thus, the illustrative embodiments provide for shifting the supply chain paradigm from reactive to preemptive. The ledger of the illustrative embodiments also improves the accuracy of predicting the need for and coordinating part maintenance.

Within the aviation parts business, there is the need to ensure the use of authentic parts from the manufacturer to the eventual and final disposition of the part. Today, this information is managed in a paper form and boxed for storage retention. This approach has challenges with uncertainty of information, untimely data, and limited ability to verify the accuracy of the data. With the transfer of aircraft ownership, a complete review of the aircraft maintenance records is required. This review is a costly and time-consuming effort that results in errors often due to discrepancies found in the hand-written maintenance documentation. The application of the ledger of the illustrative embodiments to the maintenance and operation tracking systems will maintain an accurate electronic record of aircraft maintenance and operations, thereby establishing an immutable as-flying configuration of the aircraft.

The aircraft digital event ledger of the illustrative embodiments is a ledger of aircraft events that is kept in association with the design, manufacture, delivery, operation, maintenance, regulatory compliance, and ownership transfer of the aircraft. Events are captured as a function of aircraft task completion during assembly, inclusive of quality assurance activities. Events are also captured as a result of an out-of-phase or out-of-variance condition during aircraft operation or during the aircraft maintenance cycle. Included in the event ledger are events provided by part and component original equipment manufacturers that supply both to the aircraft manufacturer and to the aircraft owner, operator, and maintenance entities.

The illustrative embodiments also may be integrated with software. For example, the aircraft digital event ledger of the illustrative embodiments may be integrated with external software which enables a digital twin of the aircraft or thread of digitally represented events relative to the aircraft. As this software detects events and operational events, the ledger of the illustrative embodiments is populated with event information.

Historically, data sharing within the aviation industry has been a substantial challenge. One such challenge has been the extensive use of paper documentation. Another such challenge has been the fact that disparate information systems do not conform to a specific standard system for managing event information.

The aircraft digital event ledger of the illustrative embodiments establishes a trust relationship between owners of the event ledger and the ledger information users. Authentication and access controls limit who has access to the ledger, what information can be viewed and acted upon, and what processing can be applied to the data. This capability facilitates discrete trusted sharing of information between event ledger systems and users.

Thus, the aircraft digital event ledger of the illustrative embodiments is a ledger of aircraft events and events related to the aircraft that are kept in association with the design, manufacture, delivery, operation, maintenance, regulatory compliance and ownership transfer of the aircraft. Additionally, the illustrative embodiments may also be applied to most products of substantive value for which tracking of information is desirable, such as military or commercial sea going vessels.

The illustrative embodiments enable the acquisition and analysis of planned and unplanned event data from distributed adjunct operational data sources of information associated with the design, manufacture, maintenance and operation of aircraft. This capability facilitates the digital continuity of events and digital representation of the aircraft characteristics. This capability also provides an accurate, immutable representation of an aircraft throughout the lifecycle of the aircraft. The digital sourcing and evaluation of data that is entered into the aircraft event ledger is a collaborative functional effort of evaluating and abstracting the variance of performance of the operational aircraft systems with the originating design requirements and design specifications.

The event ledger of the illustrative embodiments may also be characterized as a computing system with respective computer processing, storage, and network communications. The ledger is distinct in its capability as a shared distributed immutable source of accurate and timely information originating from things emitting or transmitting information, sensors monitoring the state and function of aircraft parts or assemblies, and operational level computer systems that are used in the design, manufacture, operation, and maintenance of aircraft. Other related, but non-operational, systems such as aircraft servicing, weather, airport data, and resource availability systems are interfaced to establish contextual environmental information relative to the event ledger entry.

The illustrative embodiments also provide for a comparative context-event ledger. The context-event ledger obtains related contextual event data associated with the aircraft digital event ledger. The context-event ledger is a defined deterministic system that has definitions of correlated environments and atmospheric conditions. In addition, the context-event ledger extends the contextual definitions through corollary analysis to the associated causal relationships. The context-event ledger establishes the ability to draw upon and define indirect influences that affect the operational performance of the airplane. These extensions, when reviewed and approved by users or regulators, are included within the event ledger's contextual definition.

The illustrative embodiments have several distinguishing characteristics that stand in contrast to other means for tracking aircraft event information. One distinguishing characteristic is that the illustrative embodiments provide a machine-to-machine immutable ledger entry, thereby reducing the inaccuracy of handwritten or discrepant information being entered into the system.

Another such characteristic is that multiple ledger instantiations onboard and off-board the aircraft are provided in support of the owner, operator, original equipment manufacturer, and regulatory interests. Another such characteristic is that event activities are correlated across multiple operational domains, thereby providing operational logistic visibility and operational enhancements. This capability also provides for extended supply chain visibility across multiple partners and functional domains within each.

Another such characteristic is that the proximity of ledger location availability allows for expeditious and enhanced decision making. Another such characteristic is that the illustrative embodiments provide for real-time aircraft event observation and contextual extraction of event ledger information from the movement control system.

Another such characteristic is that the illustrative embodiments provide entry of contextual information that relates to the event. Such contextual information is also correlated to the aircraft event ledger.

Another such characteristic is that the illustrative embodiments provide the ability to correlate information from the aircraft event ledger and the environment event ledger to enhance operational, maintenance, and support performance of the airframe. Another such characteristic is that the illustrative embodiments provide for the application of recursive analysis algorithms against event ledger entries to improve aircraft operational performance and aircraft design.

Another such characteristic is that the illustrative embodiments provide for a deterministic analysis capability of event occurrences utilizing algorithms determining the probability of event type occurrences, frequency of the event, and the fleet opportunity of the event across a fleet of aircraft based upon projected environmental events. Another such characteristic is that the ledger of the illustrative embodiments provides an immutable as-flying-configuration of the aircraft.

Another such characteristic is that the illustrative embodiments provide for corollary contribution analysis to determine when an event is expected to occur, the causality of the event, and an appropriate approach to address the unplanned event. Another such characteristic is that the illustrative embodiments verify part authenticity from the manufacturer to aircraft installation, as well as the eventual and final disposition of the part.

Thus, the illustrative embodiments provide several value propositions that both improve the operational capability and efficiency of existing aircraft related systems and introduce the opportunity for new systems. The following is a list and brief description of these enabled opportunities.

One enabled opportunity is that the illustrative embodiments provide sharing of trusted information with a set of agreed to participants within a secure distributed network. Another enabled opportunity is that the illustrative embodiments provide an improved operational data accuracy. Another enabled opportunity is that the illustrative embodiments provide for collection of data directly from the part, component, or assembly, thus reducing the errors made by individuals in recording the information.

Another enabled opportunity is that the illustrative embodiments provide an improved accuracy of part or component failure forecasting based on data in the digital event ledger. Another enabled opportunity is that the illustrative embodiments provide for improved part inventory enhancement and localization of part consumption planning. Another enabled opportunity is that the illustrative embodiments provide reduced aircraft false positive notification events through correlated event analysis, thus validating the authenticity of the event.

Two primary event types are defined and captured within the aircraft digital event log. Planned events are captured as a function of a scheduled or planned event beginning and end. Additional defined information relative to the design, manufacture, and operation of the aircraft is captured as a planned event ledger entry. This information includes, but is not limited to: personnel associated with the event; tooling and equipment utilized in the event; tooling and equipment settings and configurations; computing devices associated with the event; software and software versions associated with the event; material utilized and consumed with the event; location of the aircraft (altitude, longitude/latitude, direction, speed, attitude, etc.); procedures followed in preparation, during, and finalization of the planned event; aircraft task completion during assembly, inclusive of quality assurance; and assembly, sub-assembly, and part identification information.

Unplanned events are an out-of-phase or out-of-variance condition that occurs during the manufacturing, operation, and maintenance of the aircraft. Included in the event ledger are events identified, associated, or detected by a part or component of the original equipment manufacturer that supply both to the aircraft original equipment manufacturer and to the aircraft owning, operating, and maintaining entities.

The aircraft digital event ledger of the illustrative embodiments, and the context-event ledger of the illustrative embodiments, has integrated capability with data collection software and hardware (such as sensors, information, and operational systems) which enables operational real-time event determination. As vehicle movement data is gathered and as events are determined, the digital event ledger of the illustrative embodiments captures the event data and performs a deterministic analysis. The combination of the digital event log with data resources enables a collaborative rich data resource to conduct predictive analysis that may improve the operational efficiency and maintenance of the aircraft.

The illustrative embodiments also recognize and take into account advantages from a supply chain perspective. For example, the illustrative embodiments recognize and take into account that a current mode of operation is largely a pipeline where individual stakeholders work in isolation with poor visibility across the extended value chain. Such a schema is very reactive and provides limited insights. However, "Internet of Things" technology stands to enable the sharing of information and process integration across functional domains and stakeholders, such as but not limited to airlines, original equipment manufacturers (OEMs), parts suppliers, maintenance, repair, and overhaul suppliers, and other. One cannot over-emphasize the value and importance of process re-engineering and data sharing in the modern aviation industry. Thus, the illustrative embodiments better inform key supply chain processes, providing for improved forecasting, planning, inventory positioning, and other functions.

Thus, the illustrative embodiments of the invention support a digital supply chain capability for the aircraft manufacturing aftermarket that connects data internally and externally throughout the supply chain. The illustrative embodiments can be used to set the stage for an integrated, customer-centric supply chain.

The illustrative embodiments also provide for operational flexibility and responsiveness. This flexibility and responsiveness comes from improving the agility, speed, and accuracy of decision making provided by the illustrative embodiments.

Additionally, the illustrative embodiments provide for the convergence of operational and information technologies, such as product lifecycle management (PLM), Enterprise Asset Management (EAM), and Supply Chain Management (SCM). Enterprise Asset Management is provided for planning and execution systems, such as maintenance planning and production control. The aviation industry, the opportunity to share data and integrate processes across these critical domains is a valuable tool. The same technology that supports sensor driven decision making can be leveraged to further improve the illustrative embodiments.

In view of the above, the illustrative embodiments provide for a digital event ledger. While the term "ledger" is used, the illustrative embodiments are more than just a simple data structure or means for storing data, but rather are defined as claimed with variations as described below.

With reference now to the figures, and in particular, with reference to FIG. 1, an illustration of an aircraft is depicted in accordance with an illustrative embodiment. Aircraft 100 is an example of an aircraft in which, or for which, the aircraft digital event ledger of the illustrative embodiments may be implemented.

In this illustrative example, aircraft 100 has wing 102 and wing 104 attached to body 106. Aircraft 100 includes engine 108 attached to wing 102 and engine 110 attached to wing 104. Aircraft 100 could be any other aircraft, such as a prop aircraft, a helicopter, or some other moveable platform such as an automobile, boat, or even a building.

Aircraft 100 may have other features. For example, body 106 has tail section 112. Horizontal stabilizer 114, horizontal stabilizer 116, and vertical stabilizer 118 are attached to tail section 112 of body 106.

Figure 2:
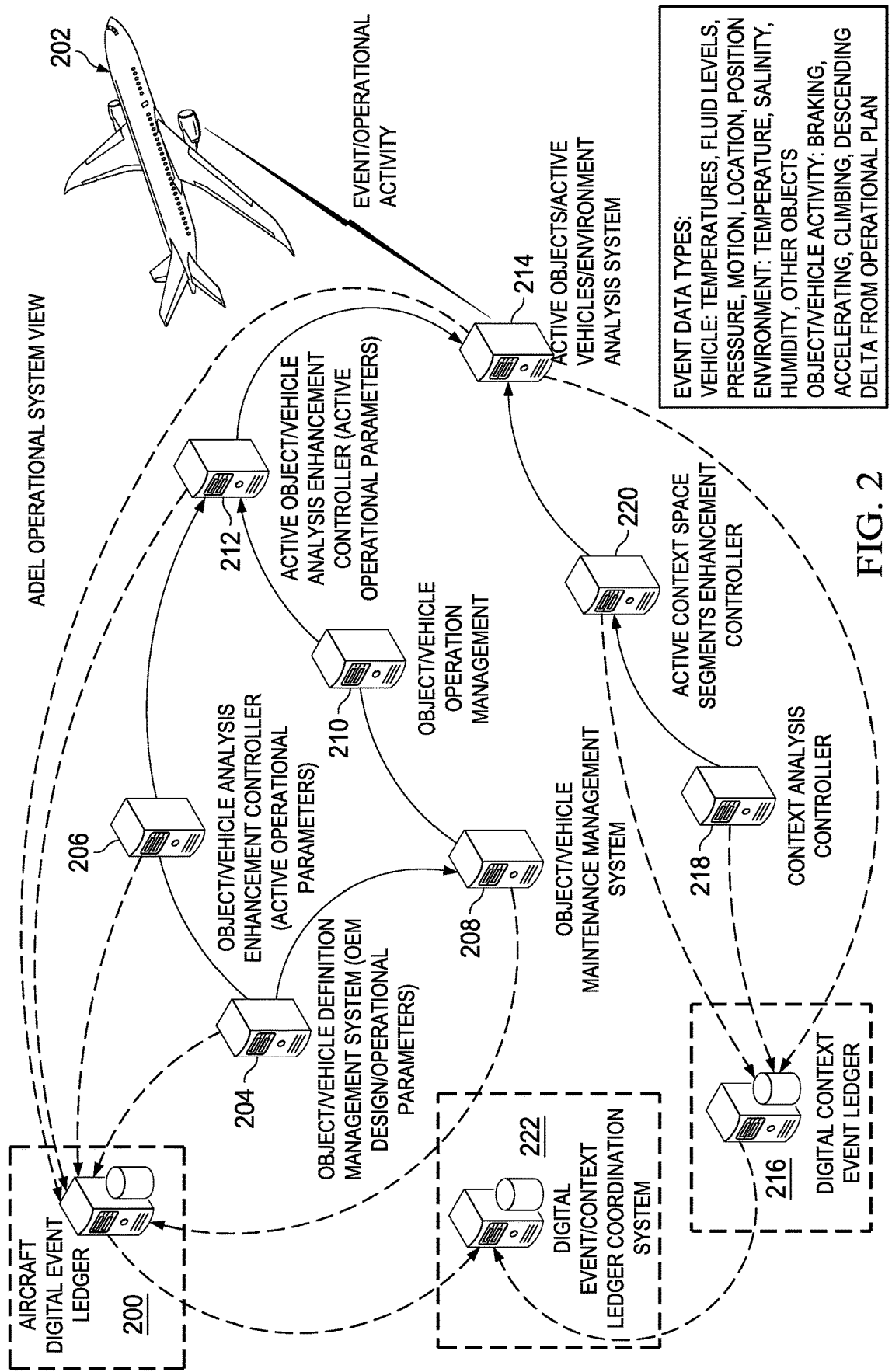
FIG. 2 is an illustration of an overview of a physical aircraft digital event ledger system, in accordance with an illustrative embodiment.

FIG. 2 is an illustration of an overview of a physical aircraft digital event ledger system, in accordance with an illustrative embodiment. In particular, FIG. 2 shows an aircraft digital event ledger (ADEL) operational system overview. Aircraft digital event ledger (ADEL) 200 may be implemented as software or hardware. Aircraft digital event ledger (ADEL) 200 is used to track information about aircraft 202. Aircraft digital event ledger (ADEL) 200 provides a capability that, until the illustrative embodiments, could only be performed by a human. In other words, aircraft digital event ledger (ADEL) 200 enables a computer to perform the data collation and evaluation which heretofore was performable solely by humans using a plurality of disparate references. Aircraft digital event ledger (ADEL) 200 also provides a unique display of information that enables a user to use a vast amount of information which, without aircraft digital event ledger (ADEL) 200, would be unintelligible to a human.

FIG. 2 provides a top-level system view of the aircraft digital event ledger (ADEL) system. As noted in the diagram, there are several operational systems that generate event data. These operation systems include, but are not necessarily limited to, object or vehicle definition management system 204, object or vehicle analysis enhancement controller 206, object or vehicle maintenance management system 208, object or vehicle operation management 210, active object or vehicle analysis enhancement controller 212, active object vehicle environmental analysis system 214, and digital context-event ledger 216.

This data is derived and populated as events recorded in aircraft digital event ledger (ADEL) 200. As the data of these events are obtained, they are associated with and correlated with environmental information data obtain from aircraft 202 and other systems that are operational in conjunction with aircraft 202.

As described above, additional supporting systems may be present. For example, digital context-event ledger 216 may receive information from context analysis controller 218 and active context and space segments enhancement controller 220, as well as from digital event/context ledger coordination system 222 (described further with respect to FIG. 3). Digital context-event ledger 216 may determine contextual information and provide such contextual information as events to aircraft digital event ledger (ADEL) 200.

Figure 3:
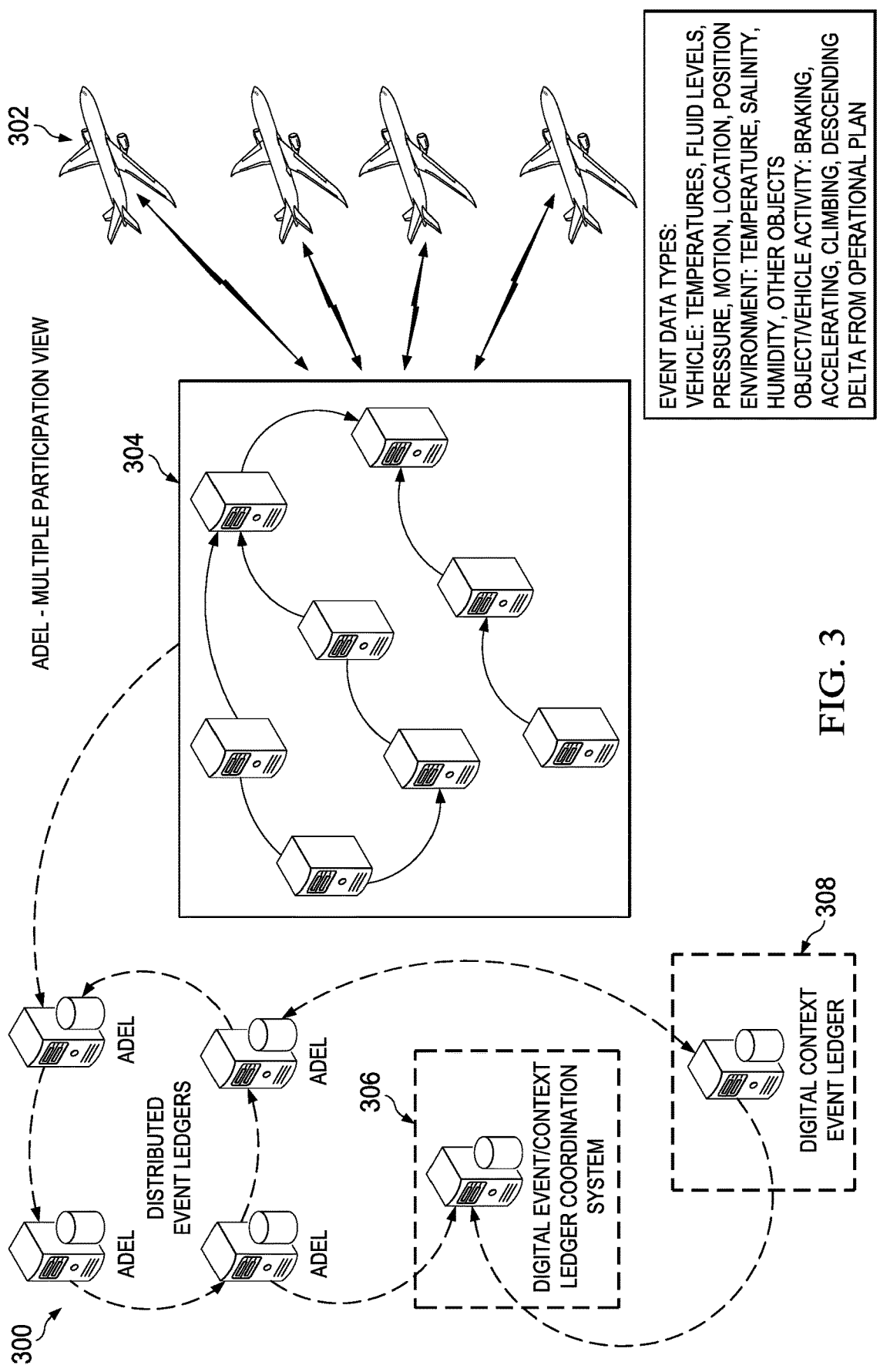
FIG. 3 is an illustration of an overview of a physical aircraft digital event ledger system for multiple aircraft, in accordance with an illustrative embodiment.

FIG. 3 is an illustration of an overview of a physical aircraft digital event ledger system for multiple aircraft depicted in accordance with an illustrative embodiment. ADEL group 300 is a variation of aircraft digital event ledger (ADEL) 200 of FIG. 2 in the context of multiple aircraft. Each individual system within ADEL group 300 may be an instance of aircraft digital event ledger (ADEL) 200 in FIG. 2.

The distribution of the aircraft digital event ledger (ADEL) supports the acquisition of data from multiple aircraft of multiple aircraft types, including but not limited, to all of the aircraft in aircraft group 302. FIG. 3 depicts each aircraft in aircraft group 302 interfacing with the respective operational systems 304 associated with one or more aircraft from one or more aircraft operators or owners. Operational systems 304 may be those, for example, shown in FIG. 2. Operational systems 304 in-turn interface with the multiple event ledger ADEL systems in ADEL group 300. Note that in some illustrative embodiments, a single digital event or context ledger coordination system 306 and digital context-event ledger 308 may be sufficient to manage the entire aircraft group 302. This system coordinates digital events and contexts entered into the ledger.

Figure 4:
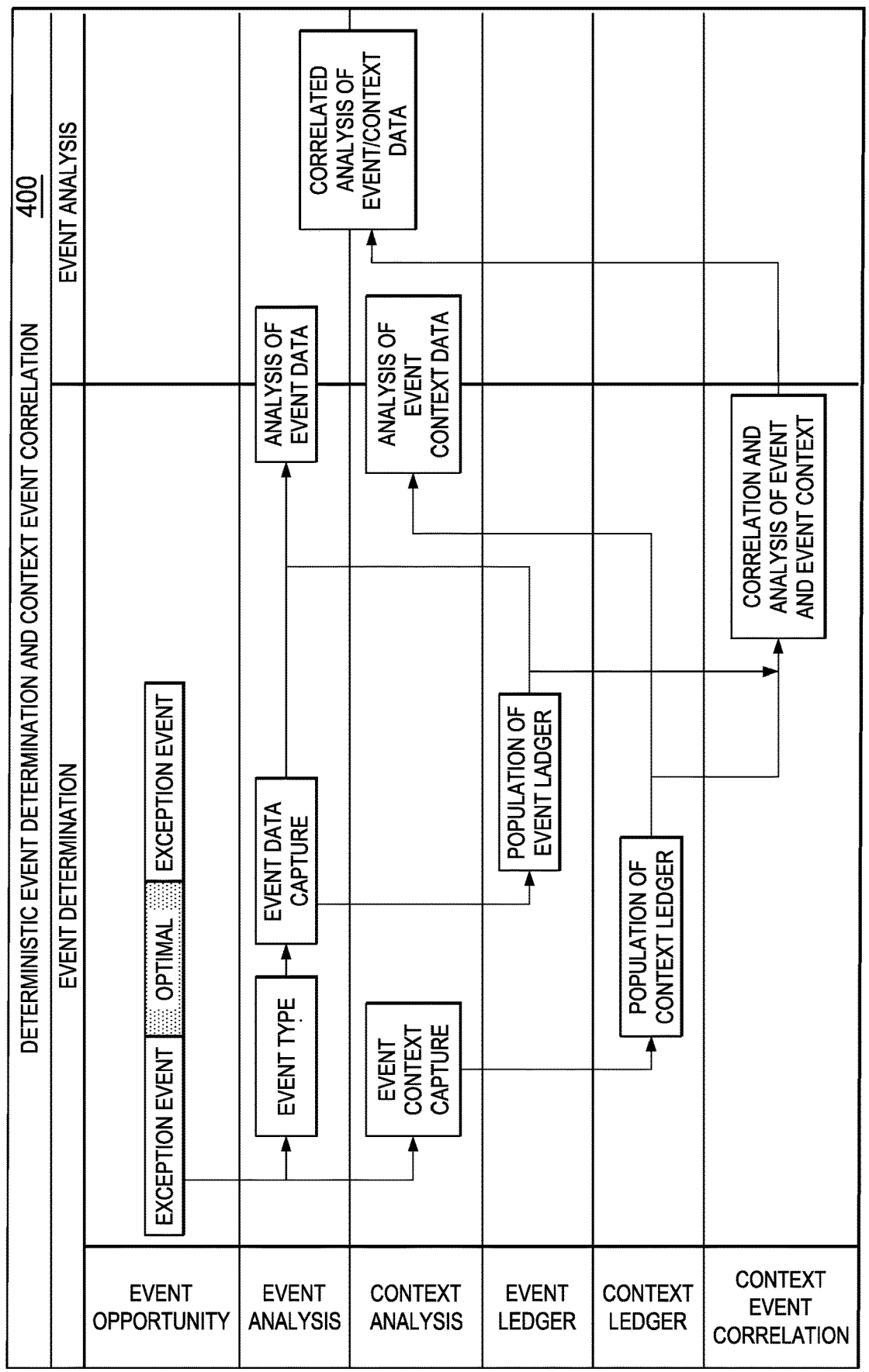
FIG. 4 is an illustration of a data flow in an aircraft digital event ledger system, in accordance with an illustrative embodiment.

FIG. 4 is an illustration of a data flow in an aircraft digital event ledger system, in accordance with an illustrative embodiment. Data flow chart 400 indicates the flow of data and process associated with planned event determination, ledger population, and deterministic analysis. Unplanned events follow a similar flow. The primary difference, as noted in the diagram, is the exception event that occurs when an activity falls outside of the desirable performance opportunity or when an unplanned event occurs.

Figure 5:
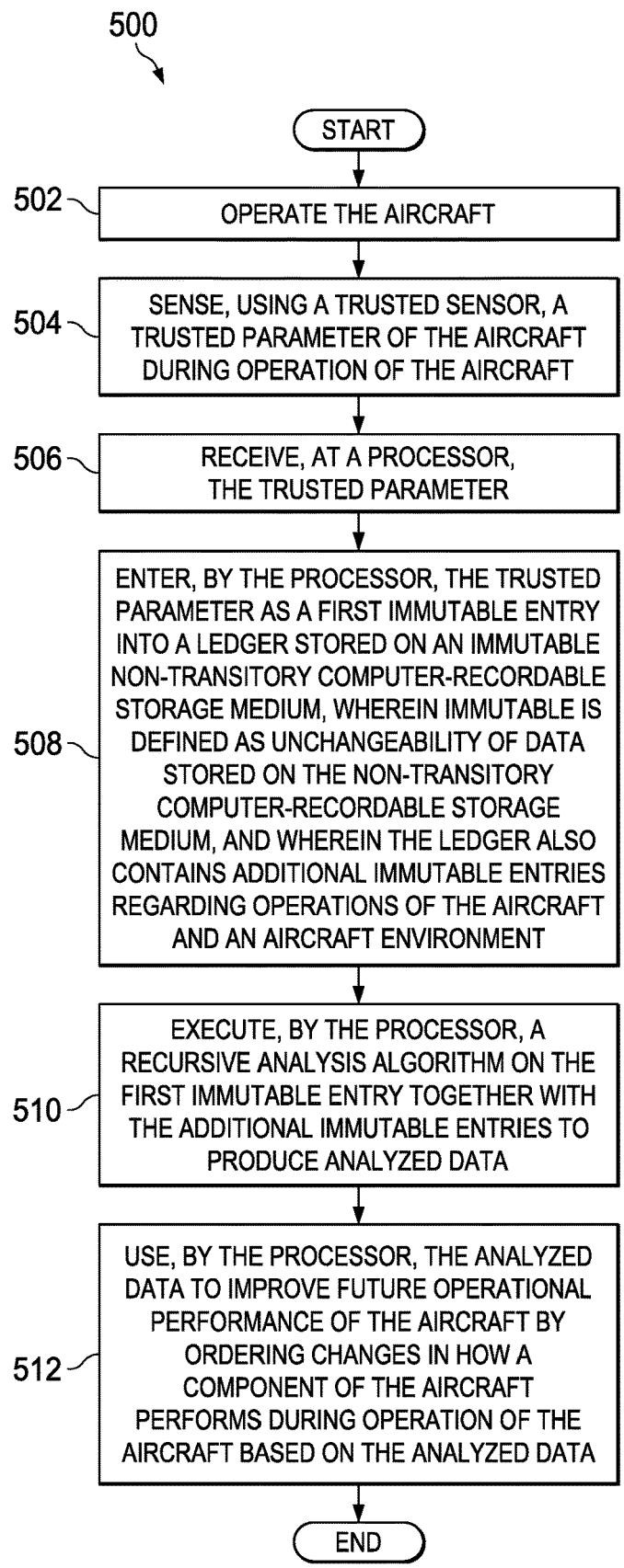
FIG. 5 is an illustration of a flowchart of a method of operating an aircraft, in accordance with an illustrative embodiment.

FIG. 5 is an illustration of a flowchart of a method of operating an aircraft depicted in accordance with an illustrative embodiment. Method 500 may be implemented in an aircraft, such as aircraft 100 of FIG. 1 or aircraft 900 of FIG. 9, and may be implemented using one or more aircraft digital event ledger (ADEL) systems, such as aircraft digital event ledger (ADEL) 200 of FIG. 2 or ADEL group 300 of FIG. 3. The ADEL systems described herein can be used to improve the operation of physical aircraft. Thus, method 500 may be characterized as a method of operating an aircraft.

Method 500 includes operating the aircraft (operation 502). Method 500 also includes sensing, using a trusted sensor, a trusted parameter of the aircraft during operation of the aircraft (operation 504).

Method 500 also includes receiving, at a processor, the trusted parameter (operation 506). Method 500 also includes entering, by the processor, the trusted parameter as a first immutable entry into a ledger stored on an immutable non-transitory computer-recordable storage medium, wherein immutable is defined as unchangeability of data stored on the non-transitory computer-recordable storage medium, and wherein the ledger also contains additional immutable entries regarding operations of the aircraft and an aircraft environment (operation 508).

Method 500 also includes executing, by the processor, a recursive analysis algorithm on the first immutable entry together with the additional immutable entries to produce analyzed data (operation 510). Method 500 also includes using, by the processor, the analyzed data to improve future operational performance of the aircraft by ordering changes in how a component of the aircraft performs during operation of the aircraft based on the analyzed data (operation 512). In one illustrative embodiment, the method may terminate thereafter.

Method 500 may be varied. For example, the sensor may be one of an onboard sensor, an off-board sensor, multiple sensors, and a combination of both onboard and off-board sensors. In another illustrative embodiment, the processor may be one of an onboard processor, an off-board processor, and a combination of both the onboard processor and the off-board processor.

In still another illustrative embodiment, method 500 may also include correlating, by the processor, event activities related to the aircraft across multiple operational domains to provide operational logistic visibility and operational enhancement. In addition, method 500 may also include maintaining the ledger in multiple instantiations both onboard and off-board the aircraft.

In another illustrative embodiment, method 500 may also include logging contextual event information associated with the trusted parameter. In this case, method 500 may also include correlating the contextual event information with the trusted parameter to form a correlation, and further including the correlation when performing the recursive analysis.

In addition, method 500 may also include determining a probability of a future event using the analyzed data. In this case, method 500 may also include using a corollary contribution analysis to estimate when the future event is expected to occur. Alternatively, in this case, method 500 may also include determining a frequency of the future event using the analyzed data.

In addition, method 500 may also include determining additional probabilities and frequencies of similar future events across a fleet of additional aircraft.

Alternatively, in the context of determining a probability of a future event, method 500 may also include estimating a cause for the future event. In this case, method 500 may also include estimating an appropriate approach to address the future event.

Still other illustrative embodiments may be possible. For example, method 500 may also include using the ledger to authenticate a part being used in the aircraft. In other examples, more or fewer operations may be present. In still other examples, the operations may be different. For example, method 500 could also be used to maintain aircraft, in addition to operating an aircraft. Thus, the illustrative embodiments are not necessarily limited to the examples provided in FIG. 5.

Figure 6:
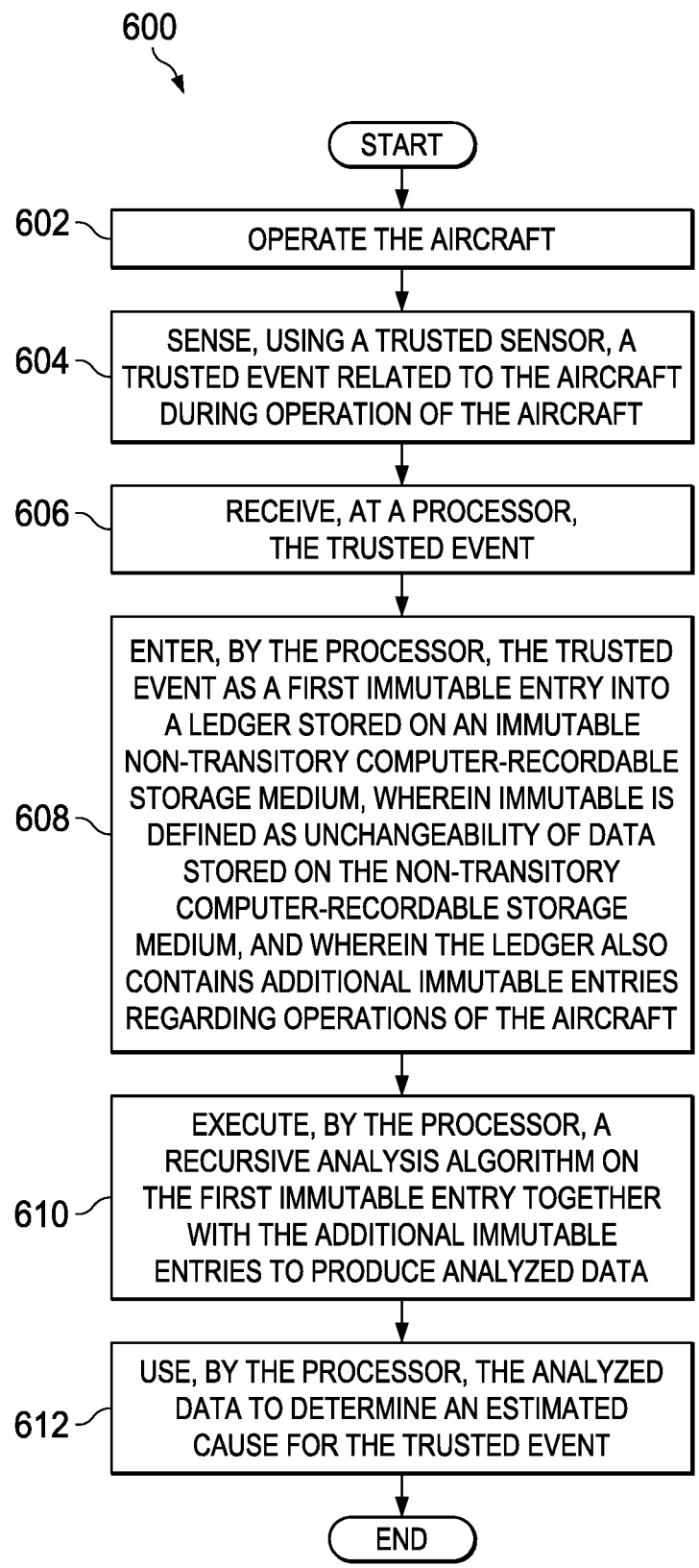
FIG. 6 is an illustration of a flowchart of another method of operating an aircraft, in accordance with an illustrative embodiment.

FIG. 6 is an illustration of a flowchart of another method of operating an aircraft depicted in accordance with an illustrative embodiment. Method 600 may be implemented in an aircraft, such as aircraft 100 of FIG. 1 or aircraft 900 of FIG. 9, and may be implemented using one or more aircraft digital event ledger (ADEL) systems, such as aircraft digital event ledger (ADEL) 200 of FIG. 2 or ADEL group 300 of FIG. 3. Method 600 is a variation of method 500 of FIG. 5. The ADEL systems described herein can be used to improve the operation of physical aircraft. Thus, method 600 may be characterized as a method of operating an aircraft.

Method 600 includes operating the aircraft (operation 602). Method 600 also includes sensing, using a trusted sensor, a trusted event related to the aircraft during operation of the aircraft (operation 604). The trusted event is defined as data received from a sensor that is predetermined to be trustworthy.

Method 600 also includes receiving, at a processor, the trusted event (operation 606). Method 600 also includes entering, by the processor, the trusted event as a first immutable entry into a ledger stored on an immutable non-transitory computer-recordable storage medium, wherein immutable is defined as unchangeability of data stored on the non-transitory computer-recordable storage medium, and wherein the ledger also contains additional immutable entries regarding operations of the aircraft (operation 608).

Method 600 also includes executing, by the processor, a recursive analysis algorithm on the first immutable entry together with the additional immutable entries to produce analyzed data (operation 610). Method 600 also includes using, by the processor, the analyzed data to determine an estimated cause for the trusted event (operation 612).

Method 600 may be varied. For example, method 600 may also include estimating an efficient approach to addressing the trusted event. In another example, method 600 may also include the trusted event being a part of the aircraft operating outside of predefined operating parameters.

Still other illustrative embodiments may be possible. For example, method 600 may also include using the ledger to authenticate a part being used in the aircraft. In other examples, more or fewer operations may be present. In still other examples, the operations may be different. For example, method 600 could also be used to maintain aircraft, in addition to operating an aircraft. Thus, the illustrative embodiments are not necessarily limited to the examples provided in FIG. 6.

Figure 7:
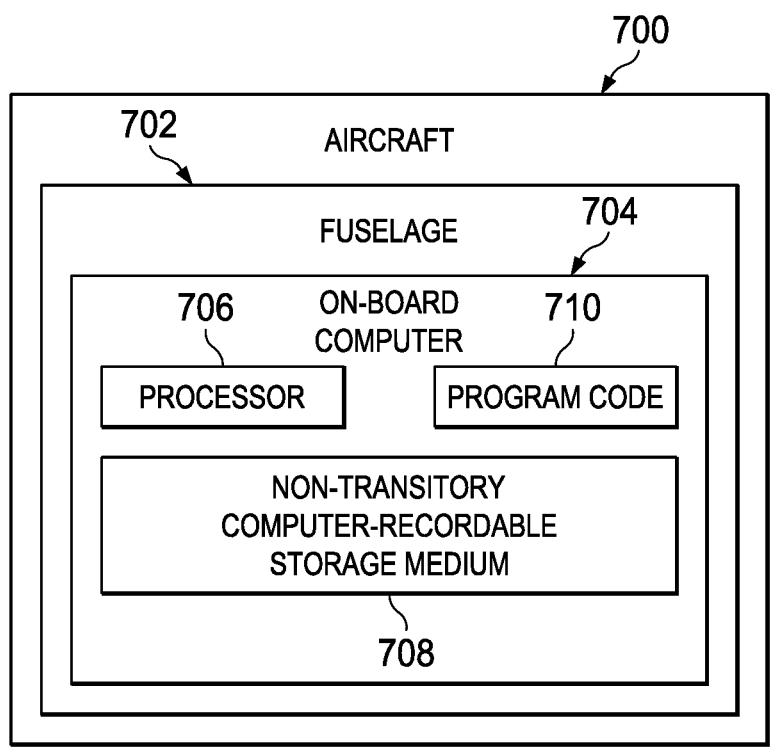
FIG. 7 is an illustration of a block diagram of an aircraft, in accordance with an illustrative embodiment.

FIG. 7 is an illustration of a block diagram of an aircraft depicted in accordance with an illustrative embodiment. Aircraft 700 is an example of an aircraft in which the aircraft digital event ledger of the illustrative embodiments described herein may be implemented. Aircraft 700 may be a variation of aircraft 100 of FIG. 1 or aircraft 900 of FIG. 9.

Aircraft 700 includes fuselage 702 and on-board computer 704 inside fuselage 702. On-board computer 704 includes processor 706 in communication with non-transitory computer-recordable storage medium 708 storing program code 710 which, when executed by processor 706, performs a computer-implemented method. Program code 710 includes code for sensing, using a trusted sensor, a trusted parameter of the aircraft during operation of the aircraft. Program code 710 also includes code for receiving, at a processor, the trusted parameter.

Program code 710 also includes code for entering, by the processor, the trusted parameter as a first immutable entry into a ledger stored on an immutable non-transitory computer-recordable storage medium. Immutable is defined as unchangeability of data stored on the non-transitory computer-recordable storage medium. The ledger also contains additional immutable entries regarding operations of the aircraft and an aircraft environment.

Program code 710 also includes code for executing, by the processor, a recursive analysis algorithm on the first immutable entry together with the additional immutable entries to produce analyzed data. Program code 710 also includes code for using, by the processor, the analyzed data to improve future operational performance of the aircraft by ordering changes in how a component of the aircraft performs during operation of the aircraft based on the analyzed data.

Program code 710 may be further varied. For example, program code 710 may also include code for correlating, by the processor, event activities related to the aircraft across multiple operational domains to provide operational logistic visibility and operational enhancement. Program code 710 also may include code for maintaining the ledger in multiple instantiations both onboard and off-board the aircraft.

Program code 710 also may include code for logging contextual event information associated with the trusted parameter. In this case, program code 710 also may include code for correlating the contextual event information with the trusted parameter to form a correlation. Also in this case, program code 710 also may include code for further including the correlation when performing the recursive analysis.

The illustrative embodiments may be still further varied. The program code may have additional functions to implement operations, such as those described above with respect to FIG. 5 or FIG. 6, or elsewhere here. The program code may also be used to improve the performing of maintenance or reworking on an aircraft. Thus, the illustrative embodiments are not necessarily limited to the examples provided with respect to FIG. 7.

Attention is now turned to additional features of the illustrative embodiments. As an overall summary, the aircraft digital event ledger of the illustrative embodiments is an electronic database of all the information pertaining to the aircraft. The illustrative embodiments address the issues that arise as a result of the fact that information on different aspects of an aircraft are maintained in different databases at different locations, some on paper and some electronic.

Thus, the illustrative embodiments provide a method to provide a comprehensive database on an aircraft. This method includes setting up an aircraft digital event ledger (ADEL) database specific to the aircraft when the aircraft enters production system. This method may also include collecting the information associated with the aircraft throughout a life of the aircraft in the ADEL database comprising: information on design of the aircraft, change orders and options selected by a customer of the aircraft, manufacturing of the aircraft, production tickets and ticket resolutions associated with manufacturing of the aircraft, quality control of the manufacturing of the aircraft, delivery of the aircraft, ongoing operation of the aircraft and identified anomalies and resolutions, maintenance of the aircraft, regulatory compliance of the aircraft, ownership transfer of the aircraft, or a combination thereof. This method may also include using the ADEL database for tasks comprising: FAA reviews, acquisition and analysis of planned and unplanned event data from distributed adjunct operational data source of information associated with the design, manufacture, maintenance and operation of the aircraft, sharing information from a fleet of aircraft for owner data analysis concerning aircraft availability and maintenance, sharing information on aircraft equipment operation for the airframe manufacturer and equipment manufacturers and regulatory agencies for improving design and predicting general issues with equipment, or a combination thereof.

Other variations are also possible. For example, the illustrative embodiments may also be characterized as a method to provide a comprehensive database on an aircraft. This method may include setting up an identification specific to the aircraft when the aircraft enters a production system. This method may also include collecting the information associated with the aircraft throughout a life of the aircraft in the ADEL database. The database may include information on design of the aircraft, change orders and options selected by a customer of the aircraft, manufacturing of the aircraft, production tickets and ticket resolutions associated with manufacturing of the aircraft, quality control of the manufacturing of the aircraft, delivery of the aircraft, ongoing operation of the aircraft and identified anomalies and resolutions, maintenance of the aircraft, regulatory compliance of the aircraft, ownership transfer of the aircraft, or a combination thereof. Then, this method may include using the ADEL database for tasks including: FAA reviews, acquisition and analysis of planned and unplanned event data from distributed adjunct operational data source of information associated with the design, manufacture, maintenance and operation of the aircraft, sharing information from a fleet of aircraft for owner data analysis concerning aircraft availability and maintenance, sharing information on aircraft equipment operation for the airframe manufacturer and equipment manufacturers and regulatory agencies for improving design and predicting general issues with equipment, or a combination thereof. Still other variations are possible. Thus, the illustrative embodiments are not necessarily limited to these examples.

Figure 8:
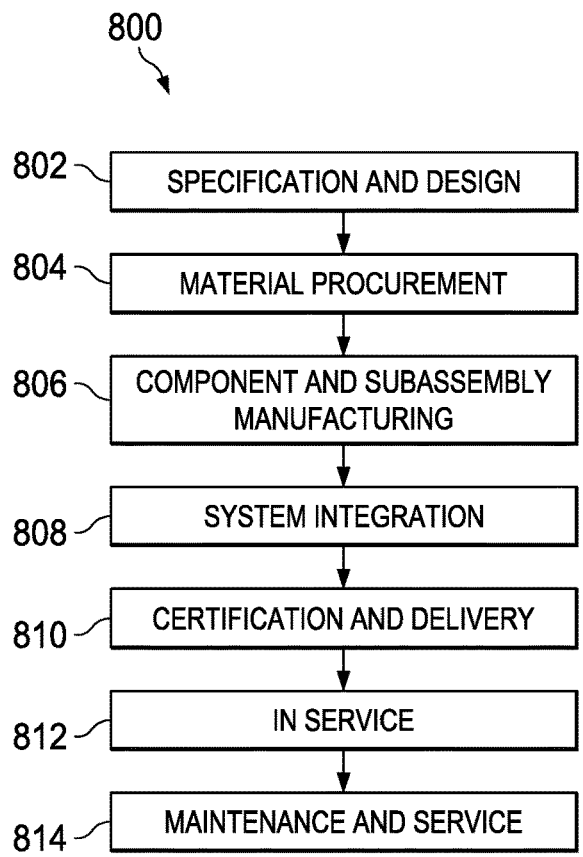
FIG. 8 is illustration of an aircraft manufacturing and service method, in accordance with an illustrative embodiment.
Figure 9:
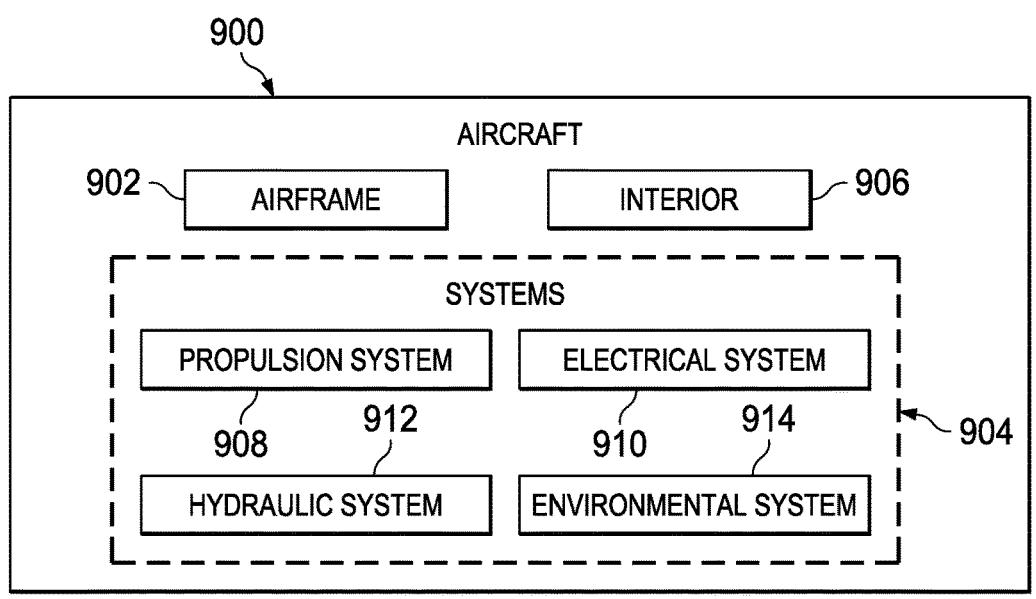
FIG. 9 is an illustration of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8.

In one illustrative example, components or subassemblies produced in component and subassembly manufacturing 806 in FIG. 8 may be fabricated or manufactured in a manner similar to components or subassemblies produced while aircraft 900 is in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812 and/or during maintenance and service 814 in FIG. 8. The use of a number of the different illustrative embodiments may substantially expedite the assembly of and/or reduce the cost of aircraft 900.

Figure 10:
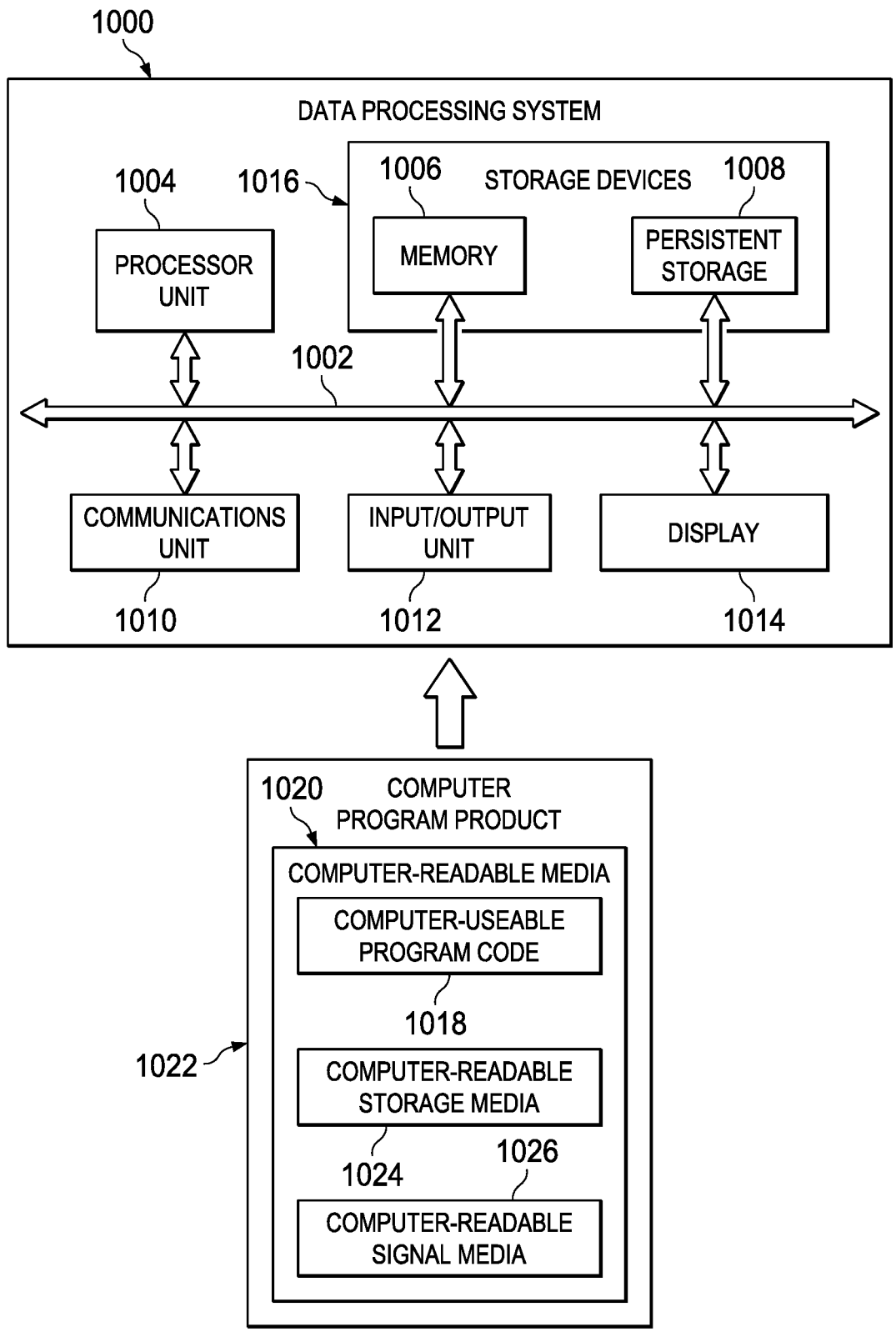
FIG. 10 is an illustration of a data processing system, in accordance with an illustrative embodiment.

Turning now to FIG. 10, an illustration of a data processing system is depicted in accordance with an illustrative embodiment. Data processing system 1000 in FIG. 10 is an example of a data processing system that may be used to in conjunction with the illustrative embodiments, such as method 500 of FIG. 5, method 600 of FIG. 6, or aircraft 700 of FIG. 7, or any other device or technique disclosed herein. In this illustrative example, data processing system 1000 includes communications fabric 1002, which provides communications between processor unit 1004, memory 1006, persistent storage 1008, communications unit 1010, input/output unit 1012, and display 1014.

Processor unit 1004 serves to execute instructions for software that may be loaded into memory 1006. This software may be an associative memory, which is a type of content addressable memory, or software for implementing the processes described herein. Thus, for example, software loaded into memory 1006 may be software for executing the algorithms described herein. Thus, such software may be program code 710 of FIG. 7.

Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information, either on a temporary basis and/or a permanent basis. Storage devices 1016 may also be referred to as computer-readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory drive, a rewritable optical disk, a rewritable magnetic tape, or some combination of the above mentioned devices. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either physical or wireless communications links, or both.

Input/output unit 1012 allows for input and output of data with other devices that may be connected to data processing system 1000. For example, input/output unit 1012 may provide a connection for user input through a keyboard, a mouse, and/or some other suitable type of input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer-useable program code, or computer-readable program code that may be read and executed by a processor in processor unit 1004. The program code in the different embodiments may be embodied on different physical or computer-readable storage media, such as memory 1006 or persistent storage 1008.

Computer-usable program code 1018 is located in a functional form on computer-readable media 1020 that is selectively removable and may be loaded onto or transferred to data processing system 1000 for execution by processor unit 1004. Computer-usable program code 1018 and computer-readable media 1020 form computer program product 1022 in these examples. In one example, computer-readable media 1020 may be computer-readable storage media 1024 or computer-readable signal media 1026. Computer-readable storage media 1024 may include, for example, an optical or magnetic disk that is inserted or placed into a drive or other device that is part of persistent storage 1008 for transfer onto a storage device, such as a hard drive, that is part of persistent storage 1008. Computer-readable storage media 1024 also may take the form of a persistent storage, such as a hard drive, a thumb drive, or a flash memory, that is connected to data processing system 1000. In some instances, computer-readable storage media 1024 may not be removable from data processing system 1000.

Alternatively, computer-usable program code 1018 may be transferred to data processing system 1000 using computer-readable signal media 1026. Computer-readable signal media 1026 may be, for example, a propagated data signal containing computer-usable program code 1018. For example, computer-readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer-usable program code 1018 may be downloaded over a network to persistent storage 1008 from another device or data processing system through computer-readable signal media 1026 for use within data processing system 1000. For instance, program code stored in a computer-readable storage medium in a server data processing system may be downloaded over a network from the server to data processing system 1000. The data processing system providing computer-usable program code 1018 may be a server computer, a client computer, or some other device capable of storing and transmitting computer-usable program code 1018.

The different components illustrated for data processing system 1000 are not meant to provide architectural limitations to the manner in which different embodiments may be implemented. The different illustrative embodiments may be implemented in a data processing system including components, in addition to or in place of those, illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components, excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, or other suitable types of hardware devices. With this type of implementation, computer-usable program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run computer-usable program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer-readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, a cache. A memory may also be memory 1006, found in an interface and memory controller hub that may be present in communications fabric 1002.

Data processing system 1000 may also include an associative memory. An associative memory may be in communication with communications fabric 1002. An associative memory may also be in communication with, or in some illustrative embodiments, be considered part of storage devices 1016. Additional associative memories may be present.

As used herein, the term "associative memory" refers to a plurality of data and a plurality of associations among the plurality of data. The plurality of data and the plurality of associations may be stored in a non-transitory computer-readable storage medium. The plurality of data may be collected into associated groups. The associative memory may be configured to be queried based on at least indirect relationships among the plurality of data, in addition to direct correlations among the plurality of data. Thus, an associative memory may be configured to be queried based solely on direct relationships, based solely on at least indirect relationships, as well as based on combinations of direct and indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data, in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which include but are not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk read-only memory (CD-ROM), compact disk read/write (CD-R/W), or DVD.

Further, a computer-usable or computer-readable medium may contain or store a computer-readable or computer-usable program code, such that when the computer-readable or computer-usable program code is executed on a computer, the execution of this computer-readable or computer-usable program code causes the computer to transmit another computer-readable or computer-usable program code over a communications link. This communications link may use a medium that is, for example without limitation, physical or wireless.

A data processing system suitable for storing and/or executing computer-readable or computer-usable program code will include one or more processors coupled, directly or indirectly, to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output unit or input/output devices can be coupled to the system either directly or through intervening input/output controllers. These devices may include, for example, without limitation, keyboards, touch screen displays, or pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of operating an aircraft, the method comprising:
   receiving, by a processor, a parameter of an aircraft, wherein the parameter is received by the processor from a sensor during operation of the aircraft;
   entering, by the processor, the parameter as a first immutable entry into a ledger stored on a non-transitory computer-recordable storage medium, wherein immutable is defined as unchangeability of data stored on the non-transitory computer-recordable storage medium such that neither the processor, nor any other processor, can ever modify the data, and wherein the ledger also comprises additional immutable entries regarding operations of the aircraft and an aircraft environment;
   performing, by the processor, recursive analysis on the first immutable entry together with the additional immutable entries to produce analyzed data; and
   using, by the processor, the analyzed data to improve future operational performance of the aircraft by ordering changes in how a component of the aircraft performs during operation of the aircraft based on the analyzed data,
   wherein the ledger is accessible through one or more devices of a secure distributed network.

2. The method of claim 1, wherein the sensor comprises one of an onboard sensor, an off-board sensor, multiple sensors, and a combination of both onboard and off-board sensors.

3. The method of claim 1, wherein the processor comprises one of an onboard processor, an off-board processor, and a combination of both the onboard processor and the off-board processor.

4. The method of claim 1 further comprising:
   correlating, by the processor, event activities related to the aircraft across multiple operational domains to provide operational logistic visibility and operational enhancement.

5. The method of claim 1 further comprising:
   maintaining the ledger in multiple instantiations both onboard and off-board the aircraft.

6. The method of claim 1 further comprising:
   logging contextual event information associated with the parameter;
   correlating the contextual event information with the parameter to form a correlation; and
   further including the correlation when performing the recursive analysis.

7. The method of claim 1 further comprising:
   determining a probability of a future event using the analyzed data.

8. The method of claim 7 further comprising:
   using a corollary contribution analysis to estimate when the future event is expected to occur.

9. The method of claim 7 further comprising:
   determining a frequency of the future event using the analyzed data.

10. The method of claim 9 further comprising:
    determining additional probabilities and frequencies of similar future events across a fleet of additional aircraft.

11. The method of claim 7 further comprising:
    estimating a cause for the future event.

12. The method of claim 11 further comprising:
    estimating an approach to address the future event.

13. The method of claim 1 further comprising:
    using the ledger to authenticate a part being used in the aircraft.

14. A method of operating an aircraft, the method comprising:
    sensing, using a sensor, an event related to an aircraft during operation of the aircraft, wherein the event is defined as data received from a sensor that is predetermined to be trustworthy;
    receiving, at a processor, the event;
    entering, by the processor, the event as a first immutable entry into a ledger stored on a non-transitory computer-recordable storage medium, wherein immutable is defined as unchangeability of data stored on the non-transitory computer-recordable storage medium such that neither the processor, nor any other processor, can ever modify the data, and wherein the ledger also comprises additional immutable entries regarding operations of the aircraft;
    performing, by the processor, recursive analysis on the first immutable entry together with the additional immutable entries to produce analyzed data; and
    using, by the processor, the analyzed data to determine an estimated cause for the event,
    wherein the ledger is accessible through a secure distributed network.

15. The method of claim 14 further comprising:
    estimating an approach to addressing the event.

16. The method of claim 14, wherein the event comprises a part of the aircraft operating outside of predefined operating parameters.

17. An aircraft comprising:
a fuselage;
an onboard computer inside the fuselage, the onboard computer comprising a processor in communication with a non-transitory computer-recordable storage medium storing program code which, when executed by the processor, performs a computer-implemented method, the program code comprising:
code for sensing, using a sensor, a parameter of the aircraft during operation of the aircraft;
code for receiving, at the processor, the parameter;
code for entering, by the processor, the parameter as a first immutable entry into a ledger stored on a non-transitory computer-recordable storage medium, wherein immutable is defined as unchangeability of data stored on the non-transitory computer-recordable storage medium such that neither the processor, nor any other processor, can ever modify the data, and wherein the ledger also comprises additional immutable entries regarding operations of the aircraft and an aircraft environment;
code for performing, by the processor, recursive analysis on the first immutable entry together with the additional immutable entries to produce analyzed data; and
code for using, by the processor, the analyzed data to improve future operational performance of the aircraft by ordering changes in how a component of the aircraft performs during operation of the aircraft based on the analyzed data,
wherein the ledger is accessible through a secure distributed network.

18. The aircraft of claim 17, wherein the program code further comprises:
code for correlating, by the processor, event activities related to the aircraft across multiple operational domains to provide operational logistic visibility and operational enhancement.

19. The aircraft of claim 17, wherein the program code further comprises:
code for maintaining the ledger in multiple instantiations both onboard and off-board the aircraft.

20. The aircraft of claim 17, wherein the program code further comprises:
code for logging contextual event information associated with the parameter;
code for correlating the contextual event information with the parameter to form a correlation; and
code for further including the correlation when performing the recursive analysis.

* * * * *